United States Patent [19]

Sugawara

[11] Patent Number: 4,534,636
[45] Date of Patent: Aug. 13, 1985

[54] AUTOMATIC FOCUSING DEVICE FOR CAMERA

[75] Inventor: Saburo Sugawara, Tokyo, Japan

[73] Assignee: Asahi Kogaku Kogyo Kabushiki Kaisha, Tokyo, Japan

[21] Appl. No.: 571,774

[22] Filed: Jan. 18, 1984

[30] Foreign Application Priority Data

Jan. 18, 1983 [JP] Japan .................................. 58-5333

[51] Int. Cl.³ .................................................. G03B 3/00
[52] U.S. Cl. ..................................................... 354/403
[58] Field of Search .............................. 354/403, 195.1

[56] References Cited

U.S. PATENT DOCUMENTS

| | | | |
|---|---|---|---|
| 3,936,187 | 2/1976 | Momose | 354/403 |
| 4,065,778 | 12/1977 | Harvey | 354/403 |
| 4,469,939 | 9/1984 | Utagawa | 354/403 |
| 4,473,285 | 9/1984 | Winter | 354/403 |
| 4,490,036 | 12/1984 | Anagnostopoulos | 354/403 |
| 4,490,037 | 12/1984 | Anagnostopoulos et al. | 354/403 |

*Primary Examiner*—Russell E. Adams
*Attorney, Agent, or Firm*—Sughrue, Mion, Zinn, Macpeak, and Seas

[57] ABSTRACT

In automatic focusing device for a camera in which the photographing lens of the camera is automatically focused on a closest object within the photographing field. An array of light detecting elements receives light reflected from a light emitting section by various objects within the photographing field. A logic circuit detects the output from the detector which represents the closest object in the field and positions the photographing lens of the camera accordingly.

7 Claims, 7 Drawing Figures

AUTOMATIC FOCUSING DEVICE FOR CAMERA

BACKGROUND OF THE INVENTION

The present invention relates to an automatic focusing device for a camera.

In a conventional automatic focusing device, a range finder section, which senses the distance to the object, senses this distance only with respect to a main object, that is, it performs the focusing operation only with respect to an extremely limited portion of the photographing field, such as the central portion. Accordingly, the composition is standardized, and hence the conventional automatic focusing device is not suitable for many picture taking situations.

In order to overcome the above-described difficulty, an automatic focusing device has been proposed in which a range finder section measuring a distance to an object at the center of the photographing field is provided, and the distance data provided by the range finder section is stored. The photographer can then compose a picture by focusing on a desired object and then moving the camera to position the desired object in a location other than at the center of the field. After the composition has been determined in this manner, the shutter is operated. However, with the device, it is necessary for the operator to perform intricate operations to determine the composition before a picture is taken. Accordingly, the device is disadvantageous in that it is difficult for the beginner to use skillfully.

In view of the foregoing, an object of the invention is to provide an automatic focusing device for a camera in which the composition of objects to be photographed can easily be determined as required, and sharp and clear pictures can be taken by simple operations.

SUMMARY OF THE INVENTION

The foregoing object of the invention has been achieved by the provision of an automatic focusing device for a camera which, according to the invention, includes a range finder section in which light emitted by a light emitting section is applied to objects to be photographed, the light reflected from the objects is received by a linear array of light detecting elements and signals are outputted by the various light detecting elements which represent distances to objects in different portions of the photographing field from an image pickup surface; scanning means for causing the range finder section to scan in a predetermined range while directing it towards a main object; a memory section for detecting and storing only the distance signal provided for an object at the shortest distance among the distance signals provided by the range finder section during the scanning operation by the scanning means; and a lens driving section for, in response to the signal stored in the memory section, moving a photographing lens to a focusing position for the object at the shortest distance.

DESCRIPTION OF THE PREFERRED EMBODIMENTS

A preferred embodiment of the invention will be described with reference to the accompanying drawings.

Figure 1:
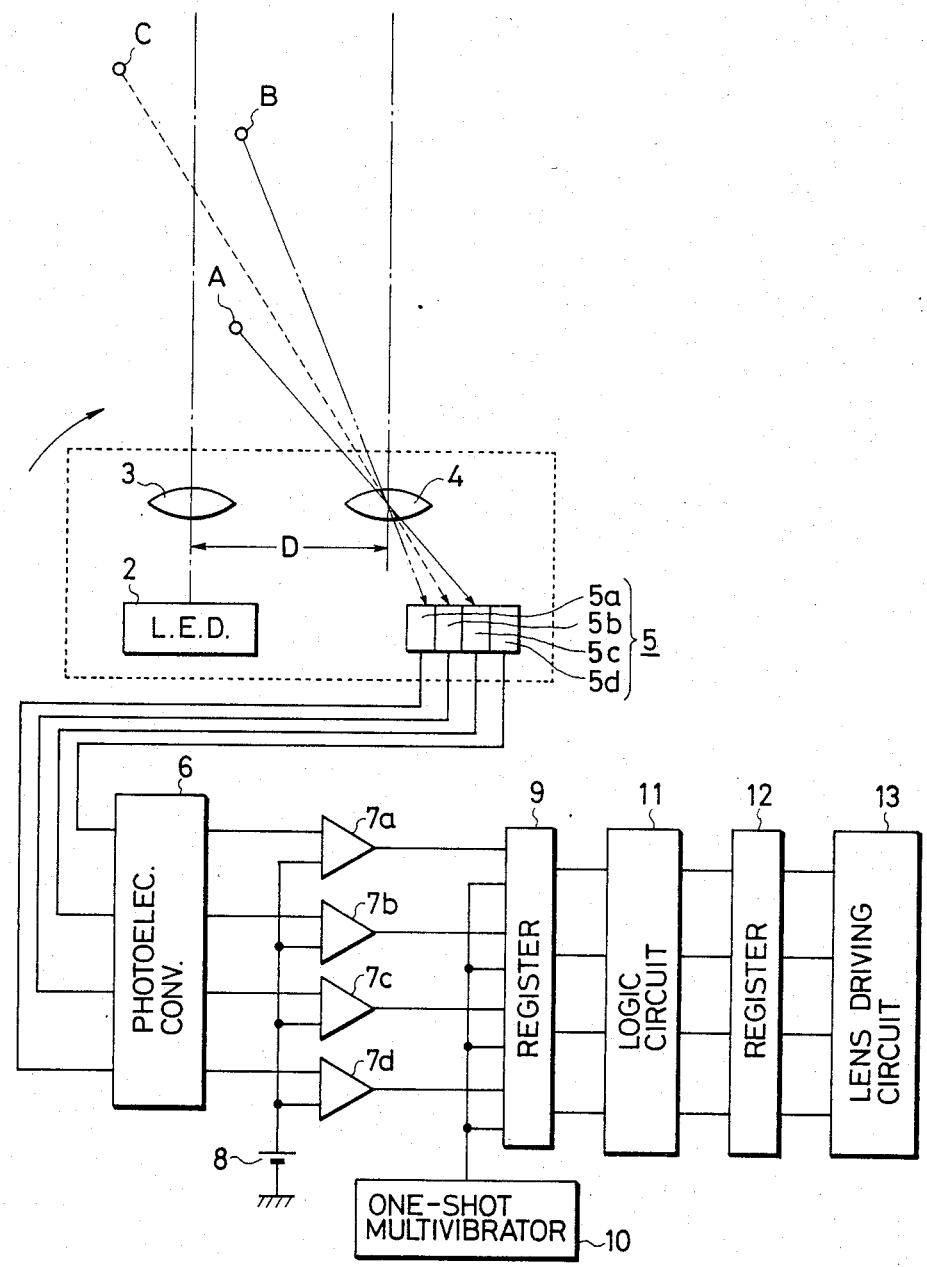
FIG. 1 is a block diagram showing the overall arrangement of an automatic focusing device of the invention.

First, the arrangement of a range finder section employed in an automatic focusing device of the invention will be described. The range finder section 1, as shown in FIG. 1, includes a light emitting section 2, first and second optical systems 3 and 4, and a light detecting element array 5. The light emitting section 2 is preferably implemented with a light emitting diode. Light emitted by the light emitting section 2 is formed into a light beam by the first optical system 3, namely, a condenser lens, and the light beam thus formed is applied to objects A, B and C. Portions of this light reflected from the objects A, B and C are applied to the light detecting element array 5 through the second optical system 4, namely, an image forming lens. The light detecting elements 5a, 5b, 5c and 5d, which form the light detecting element array 5, are arranged in a line extending perpendicular to the optical axes of the optical systems 3 and 4. For convenience in description, the number of light detecting elements in the light detecting element array 5 is only four, although more such elements may ordinarily be provided.

The range finder section 1 is so designed that it rotates while confronting the objects A, B and C, thereby to scan the objects A, B and C. The image forming position on the light detecting element array 5 is equivalent to the position of an image pickup surface. A rotating drive mechanism, which effects the scanning of the range finder section 1, is so designed as to scan the array 5 through a predetermined range when the shutter button (not shown) is pushed.

The outputs of the light detecting element array 5 are applied to a photoelectric conversion circuit 6 where the output photocurrents of the elements 5a through 5d are converted into corresponding voltages. The outputs of the photoelectric conversion circuit 6 are applied to first input terminals of voltage comparators 7a, 7b, 7c and 7d and there compared with a reference voltage provided by a power source 8. The outputs of the voltage comparators 7a, 7b, 7c and 7d are applied to inputs of a register 9 and are loaded into the register 9 by a pulse from a one-shot multivibrator circuit 10.

The outputs of the register 9 are supplied to a logic circuit (described below in detail). The logic circuit 8 produces as an output the distance signal corresponding to the shortest distance to the objects A, B and C (assumed to be the object A in the case of FIG. 1). The detection output is stored in a register 12, which forms a memory section together with the logic circuit 11 and the register 9. The output stored in the register 12 is applied to a lens driving circuit 13 which moves the photographing lens to the focused position for the object at the shortest distance.

Figure 2:
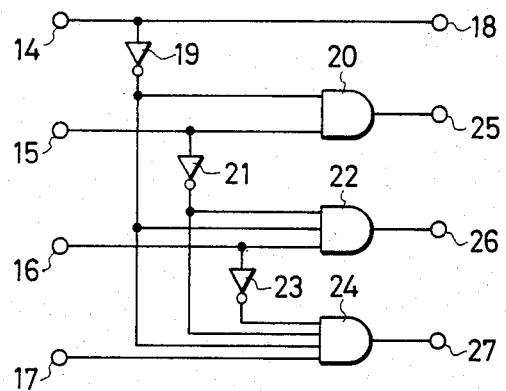
FIG. 2 is a circuit diagram showing a logic circuit used in the device of FIG. 1.

An example of the logic circuit 11 will be described in more detail. As shown in FIG. 2, the circuit 11 has four input terminals 14, 15, 16 and 17. The input terminal 14 is connected directly to an output terminal 18, and further is connected through an inverter 19 to a first input terminal of an AND gate 20. The input terminal 15 is connected to a second input terminal of the AND gate 20, and is connected through an inverter 21 to a first input terminal of an AND gate 22. The second input terminal of the AND gate 22 is connected to the output terminal of the inverter 19, and the third input terminal of the AND gate 22 is connected to the input terminal 16. The input terminal 16 is connected through an inverter 23 to a first input terminal of an AND gate 24, the second and third input terminals of which are connected respectively to the output terminals of the inverters 19 and 21. The fourth input terminal of the AND gate 24 is connected to the input terminal 17. The AND gates 20, 22 and 24 have output terminals 25, 26 and 27, respectively.

In the logic circuit 11 described above, when a high level signal is applied to the input terminal 14, it appears directly at the output terminal 18, and a low level signal is supplied to the first input terminal of the AND gate 20, the second input terminal of the AND gate 22, and the third input terminal of the AND gate 24 through the inverter 19. Accordingly, in this case, a high level signal is obtained at the output terminal 18 whether signals applied to the input terminals 15, 16 and 17 are at the high level or at the low level. In the case where a low level signal is applied to the input terminal 14 and a high level signal is applied to the input terminal 15, the output of the AND gate 20 is raised to the high level, the low level signal appears directly at the output terminal 18, and the first input terminal of the AND gate 22 and the second input terminal of the AND gate 24 are at the low level. Accordingly, in this case, no matter what level signals are applied to the input terminals 16 and 17, low level signals are obtained at the output terminals 18, 26 and 27. In the case where low level signals are applied to the input terminals 14 and 15 and a high level signal is applied to the input terminal 16, the signals at the three input terminals of the AND gate 22 are at the high level, and hence a high level signal is provided at the output terminal 26 while the outputs of the AND gates 20 and 24 are set to the low level. Accordingly, in this case, a high level signl is obtained only at the output terminal 26 no matter what level signal is applied to the input terminal 17.

In the case where a high level signal is applied to the input terminal 17 and low level signals are applied to the remaining input terminals 14, 15 and 16, a high level signal is obtained only at the output terminal 27. When low levels signals are applied to all of the input terminals 14, 15, 16 and 17, then the low level signals are provided at all the output terminals 18, 25, 26 and 27.

The high level signal applied to the input terminals 14, 15, 16 and 17 as described above indicates the object at the shortest distance from the image pickup surface, and the output terminals 18, 25, 26 and 27 instruct different settings of the photographing lens to thus suitably operate the lens driving circuit 13. When low levels signals are applied to all of the input terminals 14 through 17, the focusing position of the photographing lens is set to infinity.

Figure 3:
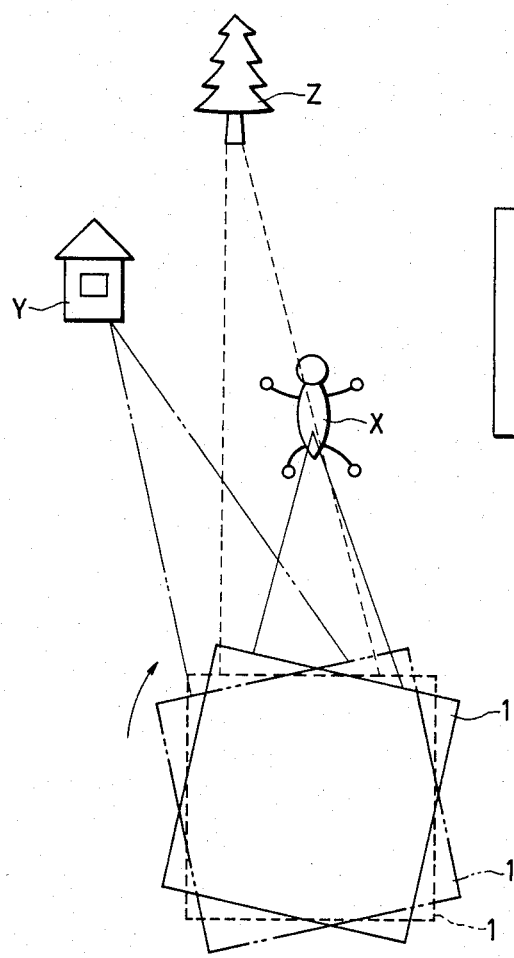
FIG. 3 is an explanatory diagram used for a description of the scanning operation of a range finder section in the device of FIG. 1.
Figure 4:
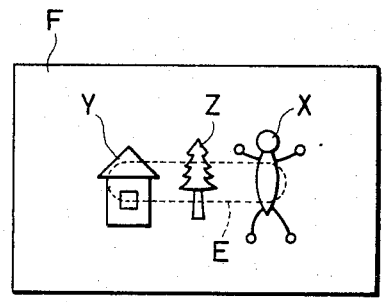
FIG. 4 is an explanatory diagram for a description of a photographing field.

The operation of the automatic focusing device thus constructed will be described. In taking a picture, the shutter button is depressed with the range finder section 1 directed towards th main object (X in FIG. 3). Depressing the shutter turns on the power switch, at which time the light emitting section 2 in the range finder section 1 emits light and, at the same time, the range finder section 1 starts rotating. While the range finder section 1 is turning, the one-shot circuit 10 outputs a pulse, clocking the register 9. The range finder section 1 is turned by the above-described rotating drive mechanism to scan the area F in the predetermined distance measurement range (as indicated by the broken line) thereby to measure distances.

Light emitted by the light emitting section 2 and reflected from the objects is received by the light detecting elements according to the distances to the objects. For instance, in the case where, in the distance measurement range, the objects X, Y and Z are at the shortest distance, at an intermediate distance and at the longest distance, respectively, all the light detecting elements 5a, 5b, 5c and 5d receives light thus reflected. The outputs of the light detecting elements 5a through 5d are applied through the photoelectric conversion circuit to the voltage comparators 7a, 7b, 7c and 7d where they are compared with the reference voltage provided by the reference power source 8. When the outputs are higher than the reference voltage, the outputs of the comparators 7a, 7b, 7c and 7d are raised to the high level. These high level signals are stored in the register 9. Accordingly, the signals applied to the input terminals 14, 15, 16 and 17 by the register 9 are at the high level. Therefore, only the output terminal 18 provides a high level signal, and the other output terminals 25, 26 and 27 provide low level signals, as described above.

The high level signal at the output terminal 18 is supplied to the register 12 where it is stored as the distance signal, that is, the distance signal only for the object X which is at the shortest distance. The lens driving circuit operates according to the output distance data of the register 12 to move the photographing lens as required, and then the shutter is released. These operations are achieved nearly instantaneously. Therefore, in practice, the photographing operation is accomplished merely by depressing the shutter button. In this operation, the image of the main object is clearly formed at any desired position on the image pickup surface.

Figure 5:
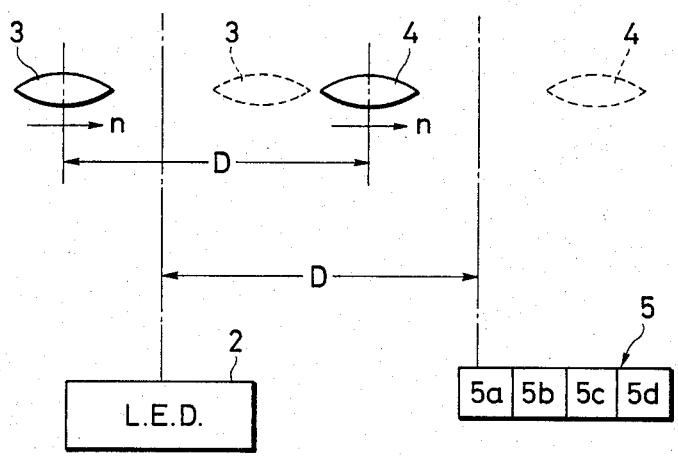
FIG. 5 is an explanatory diagram for a description of another example of a scanning device of the range finder section.
Figure 6:
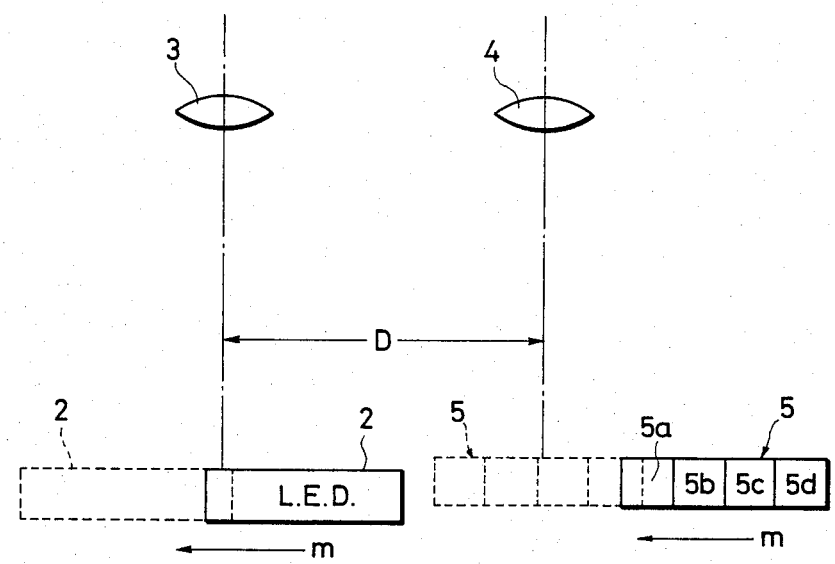
FIG. 6 is an explanatory diagram for a description of another example of a scanning device of the range finder section.

FIGS. 5 and 6 show other examples of scanning devices. In the first-described embodiment, the range finder section 1 itself is rotated. In the case of FIG. 5, the light emitting section 2 is stationary, and a drive mechanism (not shown) is provided to move the first and second optical systems 3 and 4 in the longitudinal direction of the light detecting element array 5 (in the direction of a arrow n in FIG. 5), that is, the direction along which the light detecting elements are arranged, while maintaining the distance D between the optical axes of the optical systems 3 and 4 unchanged. On the other hand, in the case of FIG. 6, the first and second optical systems 3 and 4 are stationary, and a drive system is provided to move the light detcting element array 5 and the light emitting section 2 in the longitudinal direction of the light detecting element array 5 while maintaining the distance between the light emitting section 2 and the light detecting element array 5 unchanged. With either of the scanning devices shown in FIGS. 5 and 6, the position of the image of the object is changed with the relative movement of the optical systems 3 and 4 and the light detecting element array 5. This effect is equivalent to that which is obtained by rotating the range finder section 1. The other components and their operations are the same as those which have been described before.

Figure 7:
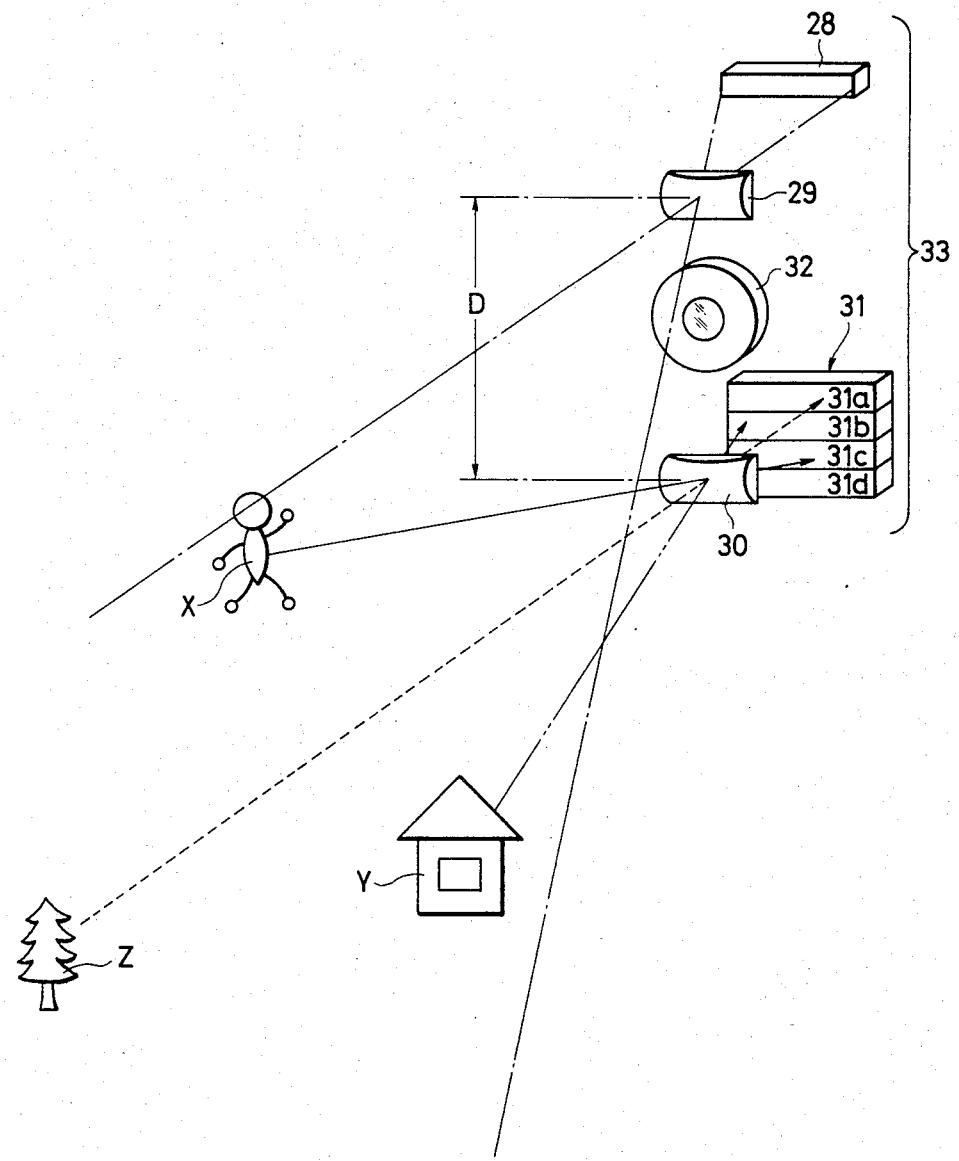
FIG. 7 is an explanatory diagram showing a modification of the range finder section in which scanning is eliminated.

FIG. 7 shows another example of the range finder section which in this case, can measure distances without mechanical scanning. In this example, the light emitting section is an elongated light source 28 which extends in a horizontal direction, and the first optical system is a cylindrical condenser lens 29 which is arranged confronting the elongated light source 28. The second optical system is a cylindrical image-forming lens 30 which is disposed in such a manner that there is a distance D between the optical axes of the lenses 29 and 30. An elongated light detecting element array 31 is arranged confronting the cylindrical image-forming lens 30. An imaginary line connecting the optical axes of the lenses 29 and 30 is perpendicular to the longitudinal direction of the elongated light souce 28. The longitudinal direction of each of the elongated light detecting elements 31a, 31b, 31c and 31d which form the elongated light detecting element array 31 is perpendicular to the imaginary line connecting the optical axes of the lenses 29 and 30. A photographing lens 32 is disposed between the lenses 29 and 30 which is movable along the optical axis by the above-described lens driving circuit 13.

In the range finder section 33 thus constructed, the elongated light source 28 extends in the widthwise direction of the photographing field F, and the light detecting elements in the array 31 also extend in the widthwise direction of the photographing field F. Accordingly, the effect of the light fluxes reflected from the objects X, Y and Z is equivalent to the case of scanning in the above-described examples. As the light source 28 extends horizontally, the range of application of light to an object can be adjusted and the range of scanning can be substantially increased. Therefore, an infrared flashgun, for instance, which produces a large quantity of light may be used as the light source 28. In the case of FIG. 7, the logic circuit 11 for processing the outputs of the light detecting element array 31 is the same as that in the abovedescribed example. However, since the time required for the scanning operation to measure distances is eliminated, the width of the output pulse of the one-shot circuit 10 can be greatly decreased. The other components and their operations are the same as those of the above-described examples.

As is apparent from the above description, according to the invention, the distance between the image pickup surface and an object at the shortest distance is measured and the photographing lens is positioned accordingly. Thus, no matter where the main object is positioned, sharp and clear pictures can be taken. Furthermore, as it is unnecessary for the operator to perform inticate operations before pictures are taken, cameras employing the automatic focusing device of the invention are suitable for beginners.

I claim:

1. An automatic focusing device for a camera, comprising:
   a range finder section comprising a light emitting section for applying light to objects to be photographed at predetermined spaced positions within a photographing field and a linear array of light detecting elements for producing output distance signals representing distances of said objects to an image pickup surface;
   means for directing light reflected from said objects onto corresponding ones of said light detecting elements;
   logic and memory means for detecting and storing among said distance signals only a distance signal corresponding to an object at a shortest distance among said objects; and
   a lens driving section, operating in response to said signal stored in said memory section, for positioning a photographing lens to a focusing position for said object at the shortest distance.

2. The automatic focusing device as claimed in claim 1, wherein said directing means comprises means for scanning said range finder section by rotating said range finder section through said predetermined range.

3. The automatic range finding device as claimed in claim 2, wherein said range finder section comprises a first optical system for applying light from said light emitting section to said objects, and a second optical system for applying light reflected from said objects to said array of light detecting elements, and wherein said scanning means comprises a drive mechanism for moving said first and second optical systems in a longitudinal direction of said light detecting elements while maintaining constant a distance between said first and second optical systems.

4. The automatic focusing device as claimed in claim 2, wherein said range finder section comprises a first optical system for applying light from said light emitting section to said objects, and a second optical system for applying light reflected from said objects to said array of light detecting elements, and wherein said scanning means comprises a drive mechanism for moving said array of light detecting elements in a longitudinal direction of said light detecting elements.

5. The automatic focusing devices claimed in claim 1, wherein said light emitting section comprises an elongated light source extending lengthwise in a direction perpendicular to a longitudinal direction of said light detecting elements, and wherein said range finder comprises a rectangular condenser lens for applying light from said light emitting section to said objects extending parallel to a longitudinal direction of said light emitting elements, and a rectangular image-forming lens for applying light reflected from said objects to said array of light detecting elements, said rectangular condenser lens being arranged parallel to said rectangular image-forming lens with a predetermined fixed distance therebetween.

6. The automatic focusing device as claimed in claim 5, wherein said rectangular condenser lens and said rectangular image-forming lens are disposed on opposite sides of said photographing lens.

7. The automatic focusing device of claim 1, wherein said logic and memory comprises a photoelectric converting circuit for converting output currents produced by said light detecting elements to corresponding voltages; a plurality of comparators, one for each output of said photoelectric converting circuit, for comparing corresponding outputs of said photoelectric converting circuit with a reference potential; a register for storing outputs of said comparators; and logic circuit means for producing an output signal in an active state representing a lowerest-order one of said outputs stored in said register in said active state.

* * * * *